(12) United States Patent
Moran (10) Patent No.: US 7,398,081 B2
(45) Date of Patent: Jul. 8, 2008

(54) DEVICE AND SYSTEM FOR SELECTIVE WIRELESS COMMUNICATION WITH CONTACT LIST MEMORY

(75) Inventor: Dov Moran, Kfar Saba (IL)

(73) Assignee: Modu Ltd., Kefar Saba (IL)

( * ) Notice: Subject to any disclaimer, the term of this patent is extended or adjusted under 35 U.S.C. 154(b) by 767 days.

(21) Appl. No.: 10/770,505

(22) Filed: Feb. 4, 2004

(65) Prior Publication Data
US 2005/0170845 A1 Aug. 4, 2005

(51) Int. Cl.
- H04M 3/42 (2006.01)
- G08B 11/04 (2006.01)
- H04Q 7/20 (2006.01)
- H04L 12/66 (2006.01)
- H04B 7/00 (2006.01)

(52) U.S. Cl. ............... 455/414.1; 455/456.1; 379/45; 340/539.18; 370/352

(58) Field of Classification Search ............ 340/539.18; 455/456.1, 414.1, 414.2, 456.2; 379/45, 379/38; 370/352
See application file for complete search history.

(56) References Cited

U.S. PATENT DOCUMENTS

| 5,924,040 | A | 7/1999 | Trompower |
| 6,362,778 | B2 | 3/2002 | Neher |
| 6,671,351 | B2 * | 12/2003 | Menard et al. ............ 379/45 |
| 6,950,649 | B2 * | 9/2005 | Videtich ............... 455/414.1 |
| 6,993,327 | B2 * | 1/2006 | Mathis ................. 455/414.1 |
| 7,046,140 | B2 * | 5/2006 | Adamczyk et al. ..... 340/539.18 |
| 7,069,018 | B1 * | 6/2006 | Granstam et al. ........ 455/456.1 |
| 2001/0034210 | A1 | 10/2001 | Nir et al. |
| 2003/0060215 | A1 | 3/2003 | Graham |
| 2004/0252677 | A1 * | 12/2004 | Kushita ................. 370/352 |
| 2005/0170845 | A1 * | 8/2005 | Moran .................. 455/456.1 |

FOREIGN PATENT DOCUMENTS

| EP | 1176840 | 1/2002 |
| GB | 2368498 | 5/2002 |
| GB | 2375921 | 11/2002 |
| WO | WO00/22860 | 4/2000 |
| WO | WO01/84867 | 11/2001 |
| WO | WO01/97544 | 12/2001 |

* cited by examiner

Primary Examiner—William D. Cumming
(74) Attorney, Agent, or Firm—Soquel Group LLC (57) ABSTRACT

Methods, devices and systems for wireless communication. A device user defines a list of contacts and receives a collective indication of which contacts are located within a neighborhood of the device. The neighborhood is defined at the device, for example by the device itself or by the user. A plurality of device users define respective user profiles including user attributes. One of the users defines a target attribute, and receives an indication of which other users that have that attribute have devices in the first user's neighborhood. The devices communicate among themselves either indirectly, for example via cellular base stations, or directly.

17 Claims, 10 Drawing Sheets

FIG. 1

| Home | 1234567 | | |
|---|---|---|---|
| Betty | 8901234 | Family | |
| Jim | 5678901 | Family | |
| Hannah | 2345678 | Family | |
| Mom | 9012345 | Family | |
| Tom | 6789012 | Masons | Bowling |
| Dick | 3456789 | Masons | |
| Harry | 2468013 | Masons | Bowling |
| Alice | 3579135 | Client | |
| Bob | 1357902 | Client | |
| Carol | 1245780 | Client | |
| Dave | 1479642 | Client | Bowling |

Thomas Brown
Sidney Harris

FIGURE 7

| Sidney Harris |
|---|
| Range: 175 meters |
| Bearing: 39 degrees East of North |

DEVICE AND SYSTEM FOR SELECTIVE WIRELESS COMMUNICATION WITH CONTACT LIST MEMORY

FIELD AND BACKGROUND OF THE INVENTION

The present invention relates to wireless communication and, more particularly, to a method and system with which a user of a wireless transceiver can be informed which other users, of similar wireless transceivers, who are of interest to the user, are available for communication.

Cellular telephony networks are well-known and ubiquitous. A subscriber to a cellular telephony service can use a mobile telephone to communicate with other subscribers, or with subscribers to ordinary, fixed telephony service. The communication is wireless, via a set of fixed base stations.

Direct wireless communication between users of mobile handsets also is known. One such method of particular interest is the "three-in-one" usage model of "voice over BLUETOOTH™" as defined by Ericsson of Stockholm, Sweden under the BLUETOOTH™ standard for short-range ad hoc wireless networks, or "piconets". (Even though, strictly speaking, the term "piconet" is specific to the BLUETOOTH™ standard, this term is used herein to refer to an ad-hoc, temporary wireless network established under either the Bluetooth BLUETOOTH™ protocol or any similar wireless communication protocol.) In the most common implementations of the "three-in-one" model in "voice over BLUETOOTH™", the mobile telephone is used as a wireless telephone in communication with a home base station, or as a cellular telephone; but the model also includes the possibility of peer-to-peer communication in "intercom" mode.

The SERIES 60 SMARTPHONE™ software platform of Nokia Corp. Espoo, Finland supports multiplayer games in BLUETOOTH™. Users of devices that are based on this platform can get together to create a BLUETOOTH™ piconet for playing interactive multiplayer games. Friends can arrange to meet to play games, but there is no convenient way for friends to identify each other in a crowd for the purpose of spontaneously forming a BLUETOOTH™ piconet to play a game. More generally, there is no convenient way for a mobile phone user to use his/her mobile phone to identify members of a common interest group who coincidentally are nearby. The BLUETOOTH™ standard includes a "device discovery procedure" by which one BLUETOOTH™ device discovers which other BLUETOOTH™ devices are within wireless communication range; but this procedure finds all such devices, not just the devices that belong to members of a common interest group.

SUMMARY OF THE INVENTION

According to the present invention there is provided a method of communication by a user of a first wireless device, including the steps of: (a) defining a contact list that includes at least one contact name; (b) defining a neighborhood of the first wireless device, the defining being effected at the first wireless device; and (c) indicating which of the at least one contact name is associated with a respective other wireless device located within the neighborhood.

According to the present invention there is provided a method of communication by a plurality of users of respective wireless devices, including the steps of: (a) defining a respective user profile for each user, at least one user profile including at least one user attribute; (b) defining a target attribute, by one of the users; (c) defining a neighborhood of the respective wireless device of the one user, the defining being effected at the respective wireless device of the one user; and (d) indicating to the one user which of the respective wireless devices of the other users, whose respective user profiles include the target attribute among the user attributes thereof, are within the neighborhood.

According to the present invention there is provided a wireless communication device, including: (a) a transceiver for communicating with other wireless devices; (b) a contact list memory for storing a contact list that includes at least one contact name; (c) a mechanism for defining a neighborhood of the wireless communication device; and (d) a mechanism for indicating which of the at least one contact name is associated with a respective other wireless device located within the neighborhood.

According to the present invention there is provided a wireless communication device, including: (a) a transceiver for communicating with other wireless devices; (b) a mechanism for defining a neighborhood of the wireless communication device; (c) a mechanism for defining a target attribute; and (d) a display mechanism for indicating whether a respective other wireless device, of a user who has the target attribute, is located within the neighborhood.

As understood herein, a "contact name" is a character string associated with a person or other entity (the "contact") with whom a user of a wireless device may wish to communicate. Typical contact names include actual names of contacts, nicknames of contacts and telephone numbers of contacts.

The methods, devices and systems of the present invention are methods, devices and systems for communication among users of the devices. "Communication" is to be understood in a generalized sense as facilitating the possibility of interaction among users of the devices. The present invention enables a user to find out which other users, generally or as members of a common interest group, are available for interaction via their respective devices. Whether the user actually interacts with the other users is optional.

According to a first method of the present invention, a contact list that includes at least one contact name is defined for a first wireless device, typically by the user of the device; a neighborhood of the device is defined, by the user of the device or by the device itself; and an indication is provided of which of the contact names, if any, is associated with another wireless device that is located within the neighborhood. The neighborhood typically is defined by defining a neighborhood radius around the first wireless device: any other wireless device that is within the defined distance of the first wireless device is deemed to be within the neighborhood. Alternatively, the neighborhood is defined via a minimum signal strength: any other wireless device from which a signal is received by the first wireless device at a signal strength at least as great as the minimum signal strength is deemed to be within the neighborhood.

Optionally, if one of the contacts is in fact indicated to be associated with a wireless device located within the neighborhood, the user of the first wireless device communicates with the other wireless device. This communication may be direct, for example via a BLUETOOTH™ piconet, or indirect, for example via a base station of a cellular telephony network.

Preferably, the contact list includes, for at least one of the contact names, at least one respective attribute. The user of the first wireless device defines a target attribute. The indication that is provided also indicates whether the target attribute is among the attributes, if any, of each of the contact names that is associated with another wireless device located within the defined neighborhood of the first wireless device. Most preferably, only the contact names that have the target attribute are indicated.

Preferably, along with indicating which of the contact names is associated with another wireless device that is located within the neighborhood, the geographical location of at least one of those other wireless devices also is indicated. One way of indicating the geographical location of one of the other wireless devices is to indicate the range and bearing from the first wireless device to the other wireless device.

According to a second method of the present invention, a respective user profile is defined for each of a plurality of users of respective wireless devices. At least one of the user profiles includes at least one attribute of the respective user. One of the users defines a target attribute. A neighborhood of that user's wireless device is defined, by that user or by that user's wireless device; and an indication is provided of which wireless devices, if any, of the other users whose user profiles include the target attribute among those users' attributes, are located within the neighborhood.

The neighborhood typically is defined by defining a neighborhood radius around the one user's wireless device: any other wireless device that is within the defined distance of the one user's wireless device is deemed to be within the neighborhood. Alternatively, the neighborhood is defined via a minimum signal strength: any other wireless device from which a signal is received by the one user's wireless device at a signal strength at least as great as the minimum signal strength is deemed to be within the neighborhood. Optionally, if a wireless device, among whose user's attributes is the target attribute, is in fact within the neighborhood, the one user communicates with the user of that other wireless device.

Preferably, along with indicating which wireless devices, of the other users whose user profiles include the target attribute among those users' attributes, are located within the neighborhood, the geographical location of one of the wireless devices of those other users also is indicated.

A wireless communication device for implementing the first method of the present invention includes a transceiver for communicating with other wireless devices; a contact list memory for storing the contact list; a mechanism for defining the neighborhood of the wireless communication device; and a mechanism for indicating which contact names, if any, are associated with respective other wireless devices that are located within the neighborhood.

Preferably, the wireless communication device includes a mechanism for setting up a piconet that includes the wireless communication device and the other wireless device(s) that is/are located within the neighborhood.

Preferably, the wireless communication device includes a navigation mechanism for determining a location of the wireless communication device.

Preferably, the wireless communication device includes a mechanism for indicating the geographical location of one of the other wireless devices that is located within the neighborhood and that is associated with one of the contact names.

A system for implementing the first method of the present invention includes a plurality of wireless communication devices for implementing the first method of the present invention and at least one base station for managing wireless communication among the wireless communication devices. Preferably, at least one of the base stations includes a mechanism for determining the respective locations of the wireless communication devices. Alternatively, each wireless communication device includes its own mechanism for determining its own location and informing the base station(s) of that location.

To also support the second method of the present invention, the wireless communication device preferably also includes a mechanism for defining a target attribute. Each contact name optionally is associated with at least one respective attribute. The mechanism for indicating which contact name(s) is/are associated with the wireless devices that are located within the neighborhood also indicates whether the target attribute is among the attribute(s) associated with the contact name(s). Most preferably, only the contact names that have the target attribute are indicated.

A system for implementing the second method of the present invention includes a plurality of wireless communication devices that support both methods of the present invention and at least one user profile memory for storing respective user profiles of the wireless communication devices. Recall that in order to implement the first method of the present invention, each wireless communication device must include a mechanism for indicating which contact names are associated with respective other wireless devices that are located within the defined neighborhood of the wireless communication device. In order to support the second method of the present invention, if the other wireless device is a member of the plurality of wireless communication devices that support both methods of the present invention, then that mechanism also indicates whether the target attribute is among the attributes, if any, in that other wireless device's user profile. Preferably, only the contact names, that are associated with respective other wireless devices that have the target attribute among the attributes in their user profiles, are indicated.

Preferably, each wireless communication device has its own user profile memory for storing its user profile. Alternatively, the system includes at least one base station for managing communication among the wireless communication devices, and the user profile memory or memories are at the at least one base station.

A wireless communication device that supports the second method of the present invention without necessarily supporting the first method of the present invention includes a transceiver for communicating with other wireless devices, a mechanism for defining a neighborhood of the wireless communication device, a mechanism for defining a target attribute and a display mechanism for indicating whether one of the other wireless devices, whose user has the target attribute, is located within the neighborhood.

Preferably, the wireless communication device includes a mechanism for setting up a piconet that includes the wireless communication device and the other wireless device(s) that is/are located within the neighborhood.

Preferably, the wireless communication device includes a navigation mechanism for determining a location of the wireless communication device.

Preferably, the wireless communication device also includes a mechanism for indicating the geographical location of one of the other wireless devices that is located within the neighborhood and whose user has the target attribute.

Another system for implementing the second method of the present invention includes a plurality of wireless communication devices that support the second method of the present invention without necessarily supporting the first method of the present invention, and a base station for managing communication among the wireless communication devices. Preferably, at least one of the base stations includes a mechanism for determining the respective locations of the wireless communication devices. Alternatively, each wireless communication device includes its own mechanism for determining its own location and informing the base station(s) of that location.

Yet another system for implementing the second method of the present invention includes a plurality of wireless communication devices that support the second method of the present invention without necessarily supporting the first method of the present invention, and at least one user profile memory for storing respective user profiles of the wireless communication devices. For any of such wireless communication devices, if one of the other wireless devices with which that wireless communication device communicates is another such wireless communication device and the target attribute is among the user attributes in the other wireless device's user profile, then the display mechanism of the first wireless communication device indicates that the other wireless device is located within the neighborhood of the first wireless communication device. Preferably, each wireless communication device has its own user profile memory for storing its user profile. Alternatively, the system includes at least one base station for managing communication among the wireless communication devices, and the user profile memory or memories are at the at least one base station.

Graham, in U.S. patent application Ser. No. 2003/0060215, teaches a method, similar to the methods of the present invention, for indicating to a user of a cellular telephone how many other users, or even how many other users that satisfy certain selection criteria, are in system-specified or user specified geographic areas. The present invention differs from the invention of Graham in several respects, notably that the present invention identifies the other users. In addition, Graham's "geographic areas" apparently are cells, or combinations of cells, of the associated cellular network. The present invention locates the other users of interest with considerably more precision than just one cell of a cellular network.

Pelephone Communications of Givatayim, Israel offers a service called "Escape" that is similar to the present invention, in that a user of a cellular telephone can define a contact list and ask which of the contacts are in his/her neighborhood, and where (in general terms) selected contacts are located. One important difference between the present invention and Escape is that Escape does not allow the users to define their own neighborhoods but instead defines neighborhoods for the users. This distinction between the present invention and Escape is defined in the method claims as the definition of the neighborhood being effected at the wireless device of the user who wants to know which contacts are in his/her neighborhood. Defining the neighborhood at the wireless device is in contrast to the neighborhood being defined by an entity, such as a cellular base station or at the Mobile Switching Center of a GSM cellular network, that is not necessarily collocated with the wireless device when the neighborhood is defined. For example, under the present invention, the user may define the neighborhood explicitly, e.g. by using the keypad of the wireless device to enter a value of a radius, or the wireless device itself may define the neighborhood implicitly, e.g. on the basis of received signal strength. In addition, the present invention locates contacts much more precisely than Escape. Escape tells users in general terms where their contacts are (e.g., "near Ichilov hospital"). The present invention provides users with geographical coordinates of contacts.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and system by which a user of a mobile wireless communication device can be shown which members of a contact list are available for communication, either via the members' own mobile wireless communication devices or face-to-face. In particular, the indication can be restricted to only members of the contact list who have a specifically targeted attribute, such as belonging to a specific interest group.

The principles and operation of selective communication according to the present invention may be better understood with reference to the drawings and the accompanying description.

Figure 1:
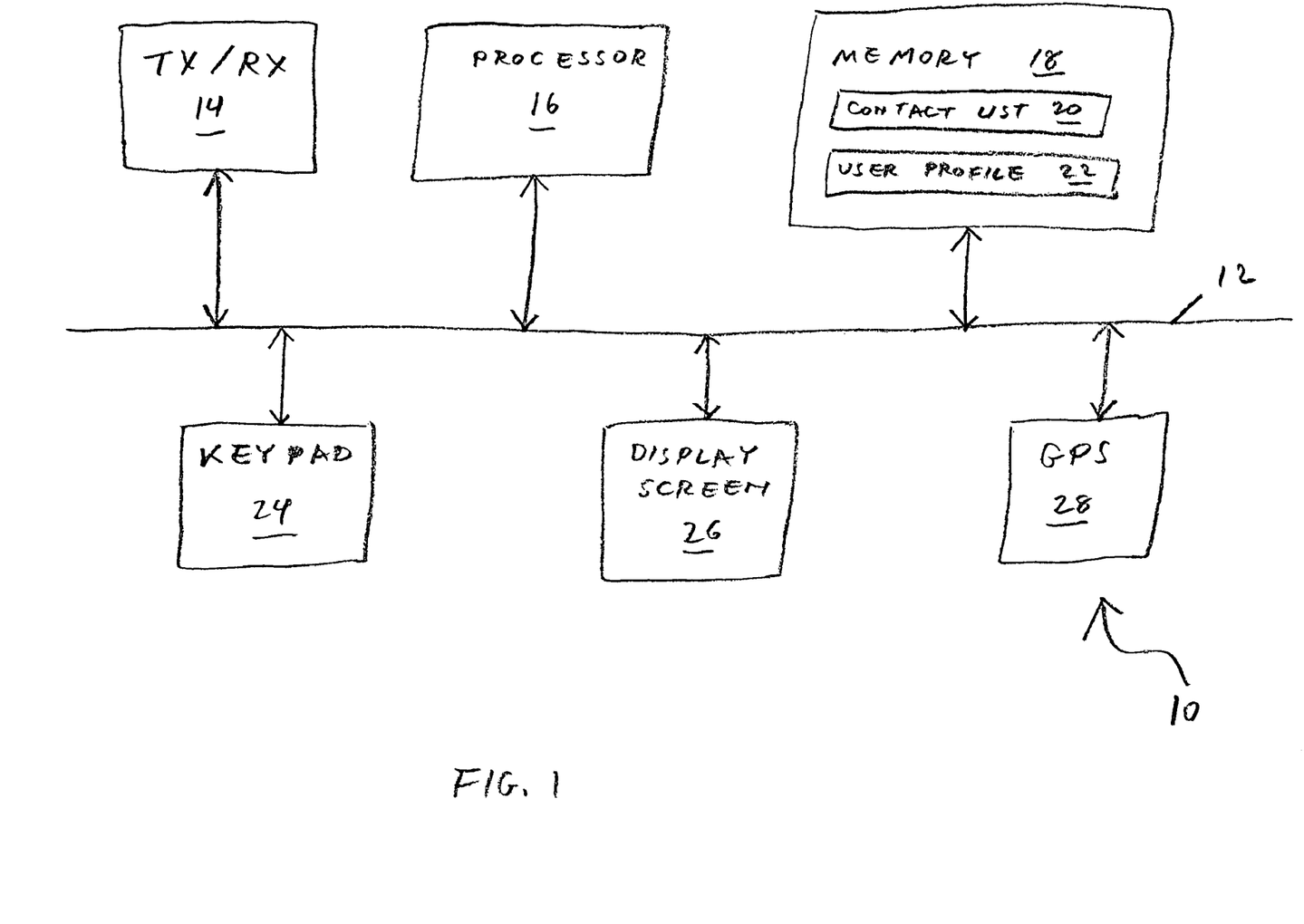
FIG. 1 is a high-level block diagram of a mobile wireless communication device of the present invention.

Referring now to the drawings, FIG. 1 is a high-level block diagram of a mobile wireless communication device 10 of the present invention. The high level components of device 10 include a transceiver 14, a processor 16, a memory 18, a keypad 24, a display screen 26 and a navigation unit 28, all intercommunicating via a common bus 12.

Transceiver 14 is a conventional transceiver that supports wireless voice communication between device 10 and another such device. As such, transceiver 14 includes a microphone for converting audible speech of a user of device 10 to electrical signals, a transmitter for modulating a radio frequency carrier wave according to those electrical signals and transmitting the modulated radio frequency wave, a receiver for receiving a similarly modulated radio frequency wave and demodulating the received wave to produce electrical signals corresponding to received audible speech, and a speaker for converting the received electrical signals to sound that is audible by the user of device 10.

Overall operation of device 10 is controlled by a conventional processor 16. Keypad 24 is a conventional data entry device, and display screen 26 is a conventional data display device, such as are familiar to users of cellular telephones. Memory 18 is a non-volatile read/write memory, such as a flash memory that stores, inter alia, two lists that are unique to the present invention: a contact list 20 and a user profile 22. Navigation unit 28 is a unit such as a GPS receiver that determines the geographical location of device 10, typically (as in the case of a GPS receiver) as the geographical coordinates of device 10 in a standard geographical coordinate system.

Figure 2:
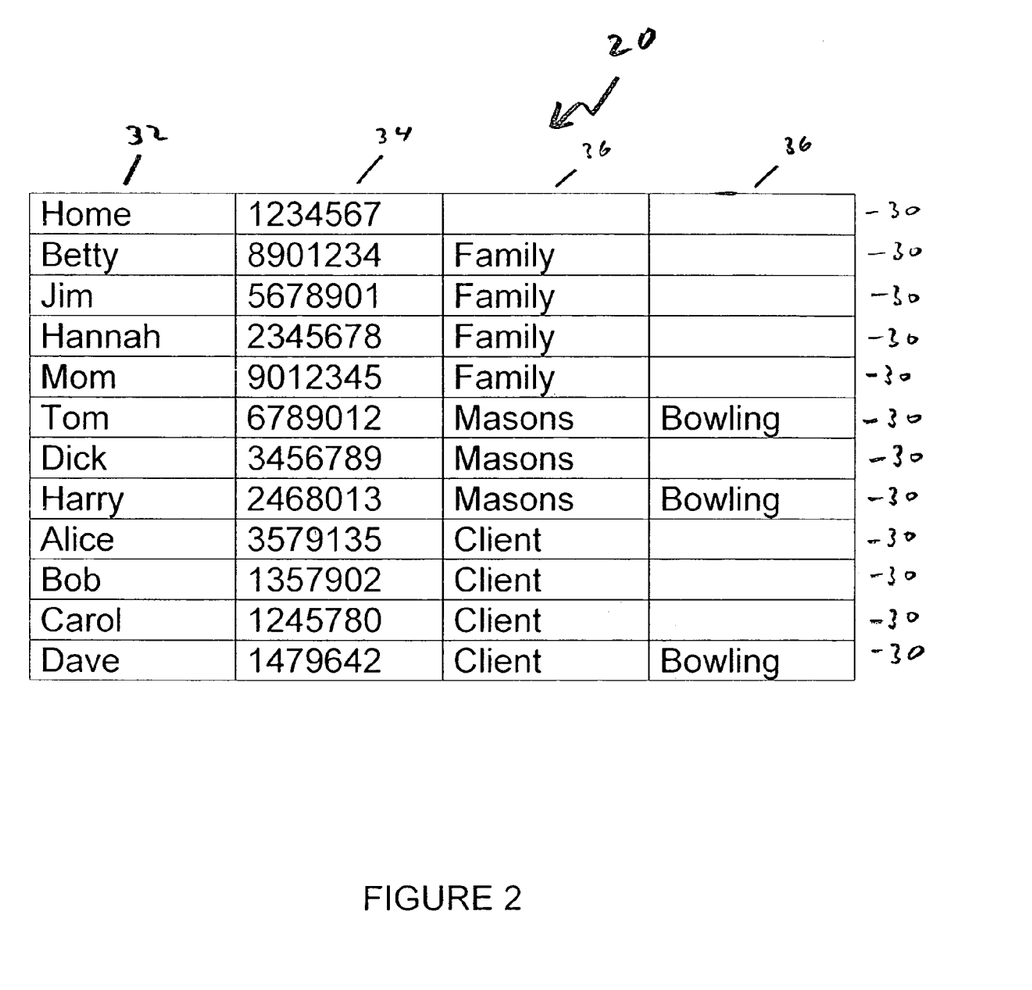
FIG. 2 shows a contact list.

FIG. 2 shows an example of a contact list 20 of the present invention. Contact list 20 is a table of names and telephone numbers of people and other entities with which the user of device 10 communicates using device 10. Each row 30 of contact list 20 is specific to a particular contact. The first column 32 of contact list 20 is for names or nicknames of contacts. The second column 34 of contact list 20 is for telephone numbers of contacts. The remaining columns 36 of contact list 20 are for user-defined attributes of the contacts. In the example shown, the attributes are membership in interest groups of interest to the user of device 10. In the example shown, there are two attribute columns 36. The table of contact list 20 is extensible to any desired number of attribute columns 34, limited only by the capacity of memory 18.

Figure 3:
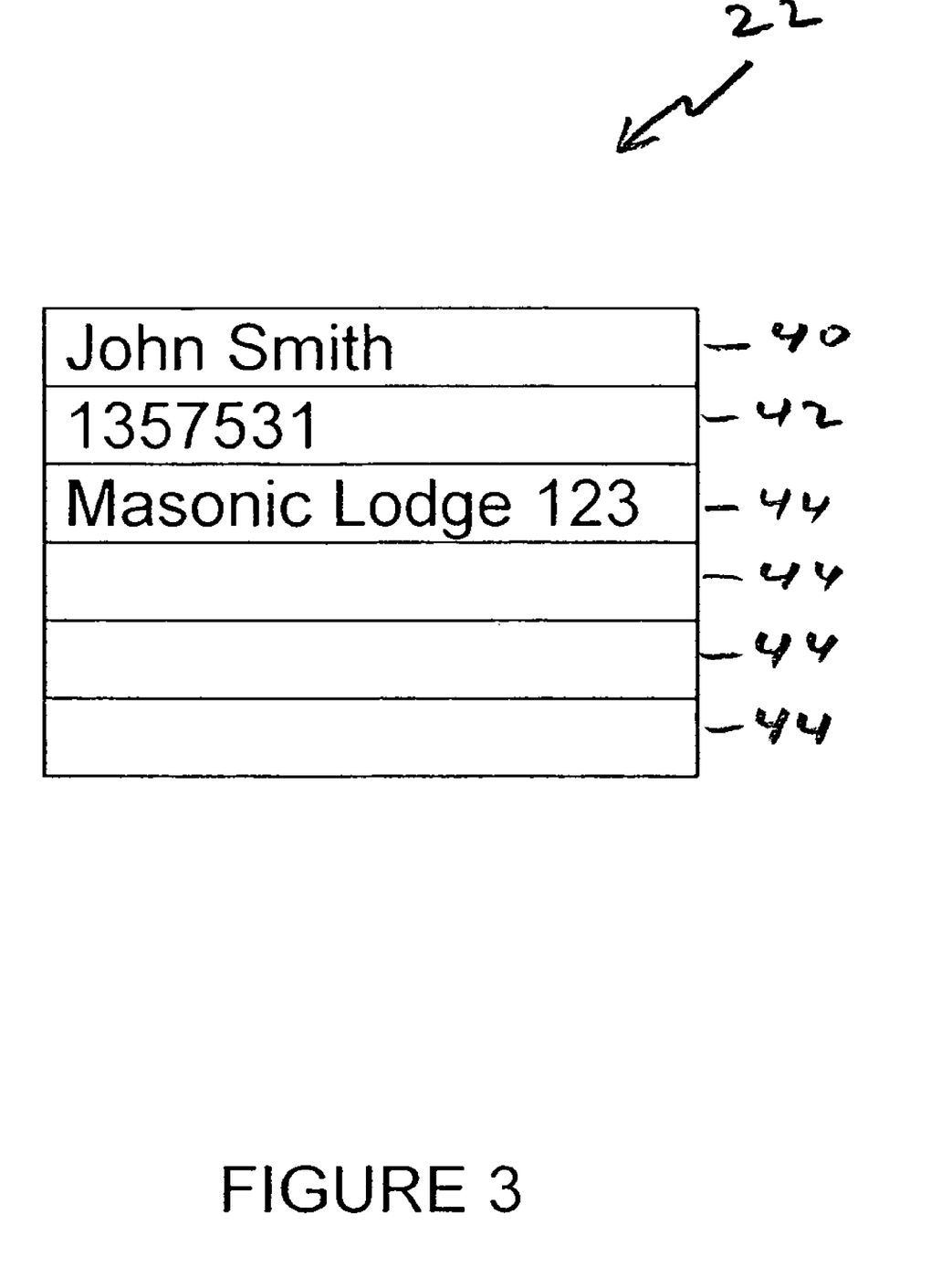
FIG. 3 shows a user profile.

FIG. 3 shows an example of a user profile 22 of the present invention. User profile 22 is a list of information about the user of device 10. The first field 40 is used to store the name of the user. The second field 42 is used to store the telephone number of the user. Subsequent fields 44 are used to store attributes of the user that the user wants to make public, so that other users of devices 10 can use the methods of the present invention to contact and/or locate that user. Only one field 44 in FIG. 3 is shown as being used to store a user attribute. The remaining fields 44 are available for future use. Note that the attributes of FIG. 2 are private attributes that are used only by the user of the device 10 that stores contact list 20 of FIG. 2, and so may be simple and general. By contrast, the attribute shown in FIG. 3 is a public attribute and so is necessarily more specific, showing that John Smith is a member of Masonic Lodge 123, and not merely that John Smith is a Mason.

Figure 4:
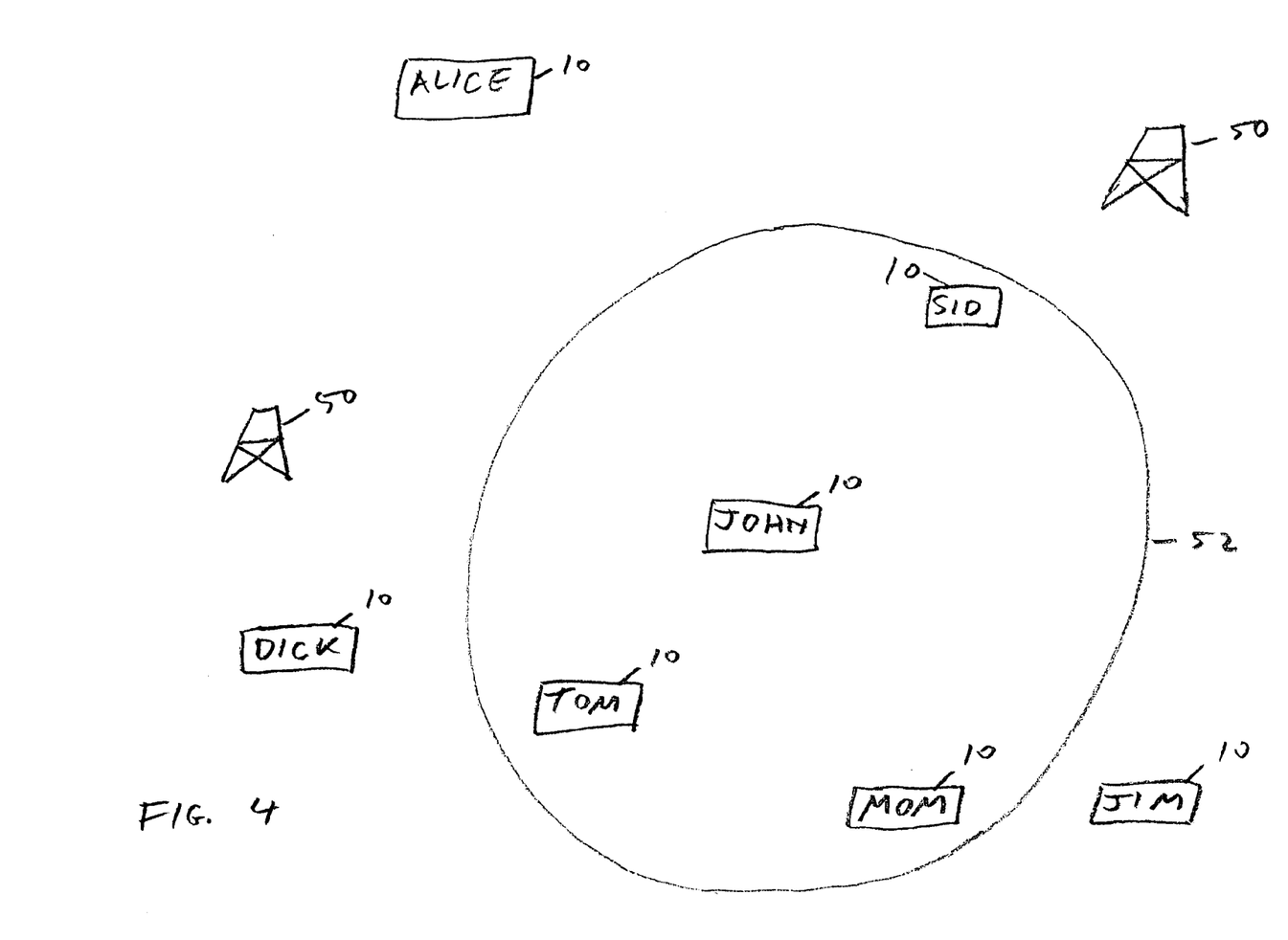
FIG. 4 illustrates a cellular telephony embodiment of the present invention.

FIG. 4 illustrates the operation of an embodiment of the present invention in which devices 10 are cellular telephones ("cell phones") that communicate with each other via base stations 50 of a cellular telephony network. In FIG. 4, devices 10 are labeled by the names of their users: JOHN is the user whose device 10 stores user profile 22 of FIG. 3, and the other users are users (JIM, MOM, TOM, DICK, ALICE) that are listed in contact list 20 of JOHN's device 10, and also SID, another member of Masonic Lodge 123. Like user profile 22 of JOHN's device 10, user profile 22 of SID's device 10 includes "Masonic Lodge 123" as a user attribute.

The following operations are performed by JOHN by appropriate use of keypad 24 to select menu items displayed on display screen 26, as is conventional in the use of cell phones. These operations produce displays on display screen 26 of the type illustrated in FIGS. 5-10. The first operation (contact list display) is a prior art operation common to cell phones generally, and is presented only as background for the subsequent operations.

Contact List Display

Figure 5:
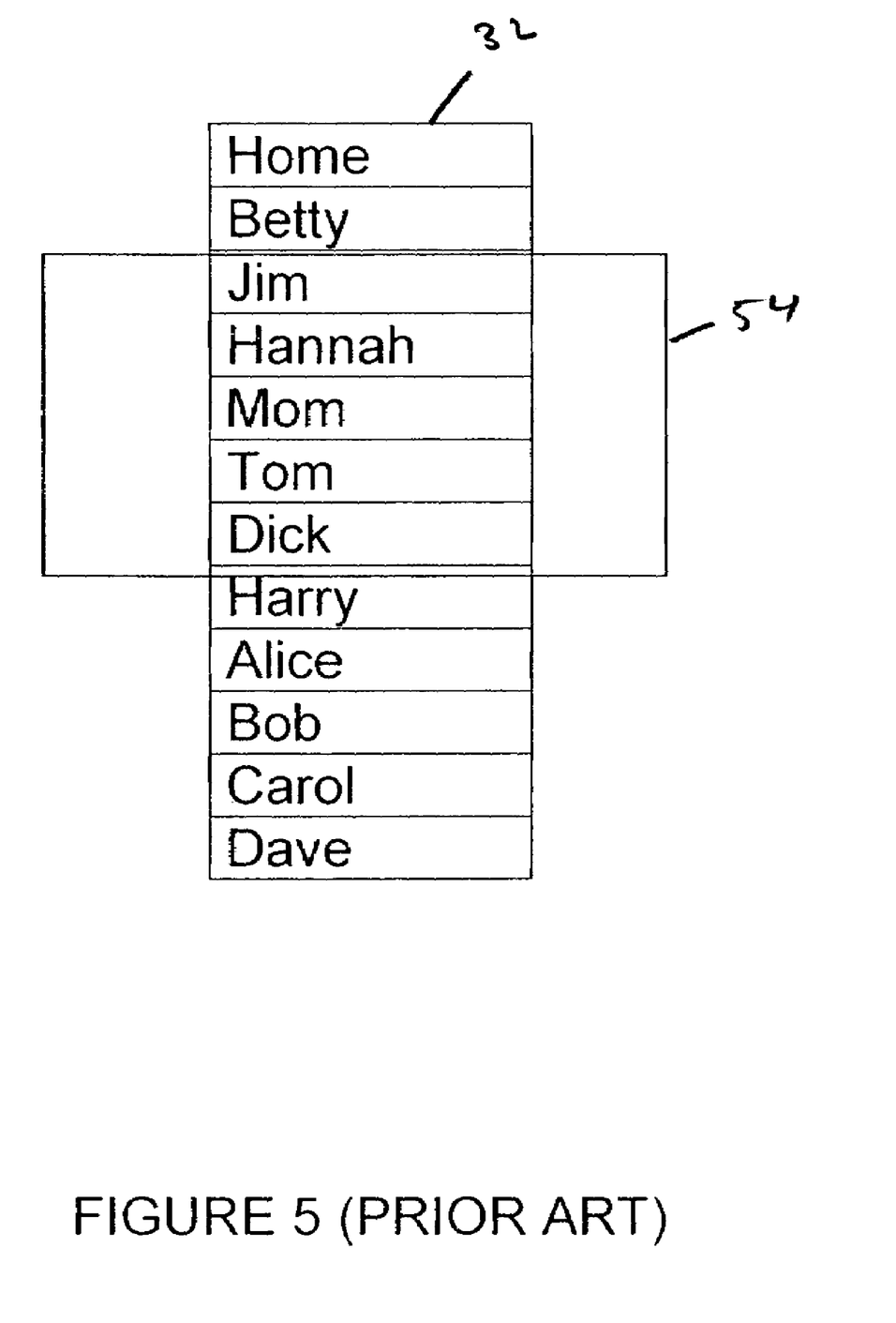
FIG. 5 is a prior art contact list display.

FIG. 5 illustrates the display of the contact names of contact list 20. Rectangle 54 outlines a portion (five lines) of column 32 of contact list that is actually displayed on display screen 26 at one time. JOHN views the entire list of contact names by scrolling the list up and down. JOHN calls a contact of his contact list 20 by selecting the name of the contact.

Defining a Neighborhood

JOHN defines a neighborhood of his cell phone 10 by entering the radius (e.g., 200 meters) of the neighborhood using keypad 24. All other cell phones 10 that are within a circle 52 of the defined radius centered on JOHN's cell phone 10 are located within the defined neighborhood.

Contacts having an Attribute

Figure 6:
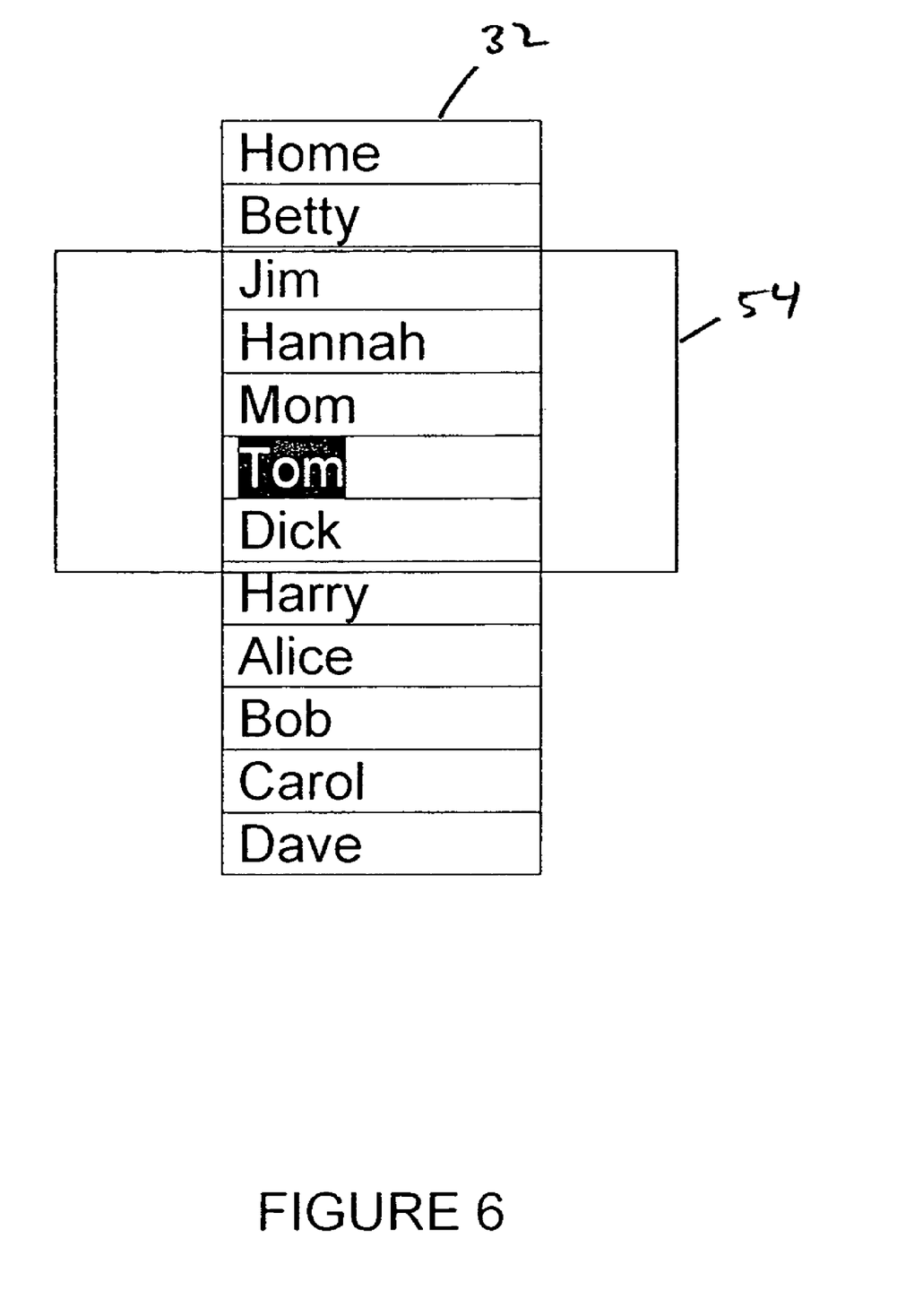
FIG. 6 is a contact list display in which the contact who is located in the neighborhood and who has the target attribute is highlighted.

To find out which contacts to whom JOHN has assigned the attribute "Mason" are within the defined neighborhood with their cell phones 10 turned on, JOHN enters the target attribute "Mason" using keypad 24. The resulting display on display screen 26 is illustrated in FIG. 6. This display is identical to the display of contact list 20 in FIG. 5. except that "TOM" is highlighted.

Alternatively, only the contacts with the attribute "Mason", whose cell phones are turned on, are displayed. In the present example, such a display would include only the name "TOM".

There are two methods by which JOHN's cell phone 10 can determine that the only contact with the attribute "Mason" that is present in the defined neighborhood is TOM.

The first method is by exploiting known techniques by which a cellular telephony network monitors the movements of its cell phones that are turned on. See, for example, Neher, U.S. Pat. No. 6,362,778 and the prior art references cited therein. Both the Neher patent and all of the prior art references cited therein are incorporated by reference for all purposes as if fully set forth herein. Each base station 50 keeps a record of the geographical locations of the cell phones that are active in the cell serviced by that base station 50 and in the neighboring cells. JOHN's cell phone 10 requests, from the base station 50 that is servicing JOHN's cell phone 10, the geographical locations of all cell phones 10 of contacts that have the attribute "Mason". That base station 50 responds by sending to JOHN's cell phone 10 the geographical locations of active cell phones 10 of all the contacts that have the attribute "Mason". Using the geographical location of JOHN's cell phone 10 as determined by navigation unit 28, processor 16 of JOHN's cell phone 10 computes the range to all of those cell phones 10. Cell phones 10 whose ranges are less than or equal to the defined radius are within the defined neighborhood. Note that this method works even for cell phones of the cellular telephony network that are not cell phones 10 of the present invention.

The second method is by successively dialing all the telephone numbers of all the cell phones 10 of the contacts with the attribute "Mason", in a background mode that does not cause those cell phones 10 to ring, but merely prompts those cell phones to reply with messages that indicate the geographical locations of those cell phones, as determined by their navigation units 28. "Background" mode is, as its name implies, a mode of operation that coexists with normal operation of a cell phone 10 and is transparent to the user of that cell phone 10. Typically, "background" mode operates via the control channel of the cellular telephony network. So, for example, a cell phone 10 can respond to a "background" mode inquiry even while the user of that cell phone 10 is engaged in conversation via that cell phone 10. As in the first method, processor 16 of JOHN's cell phone 10 computes the ranges to all cell phones 10 that respond to the background mode query from JOHN's cell phone 10. Cell phones 10 whose ranges are less than or equal to the defined radius are within the defined neighborhood. This method locates only cell phones 10 of the present invention and other similar cell phones that are equipped with navigation units such as units 28.

General Users having an Attribute

Figure 7:
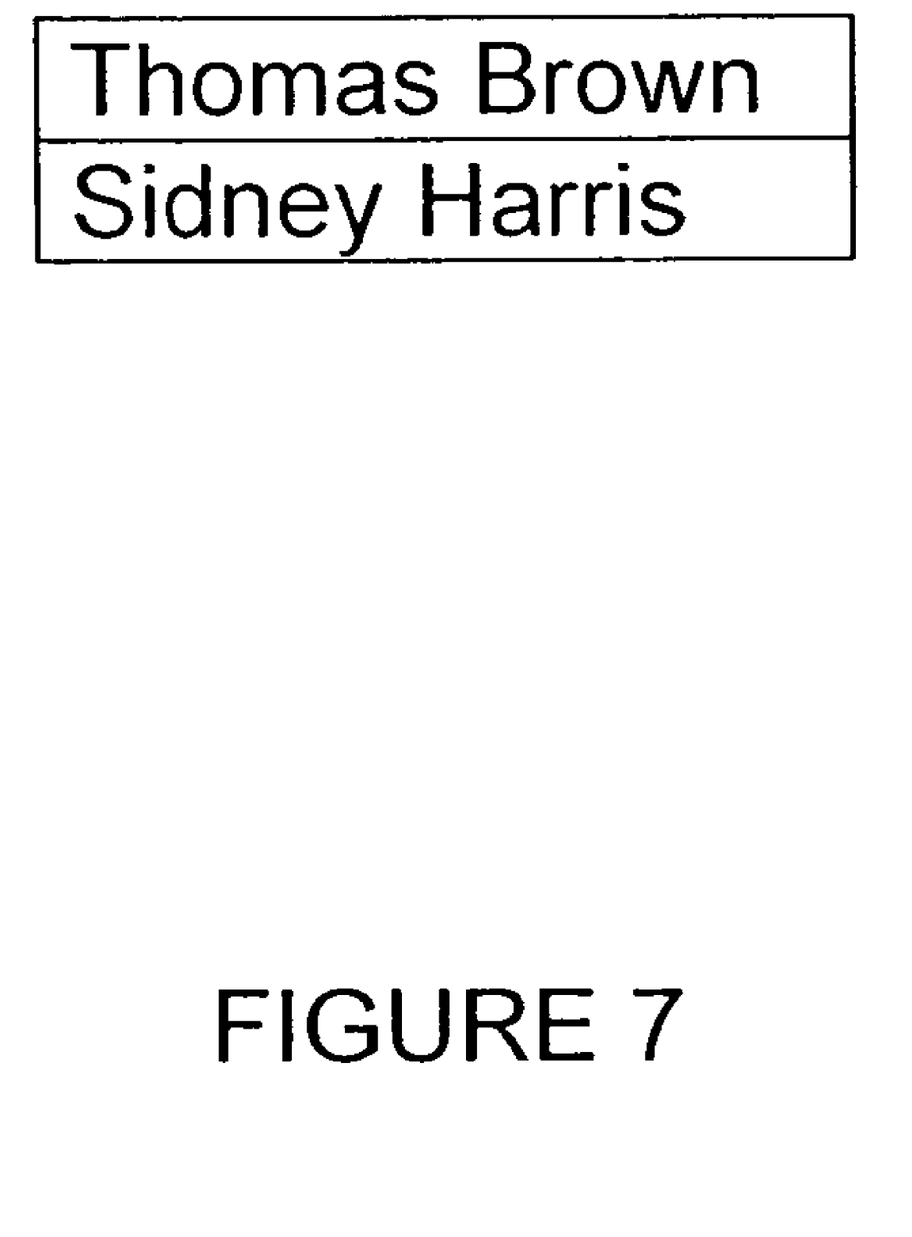
FIG. 7 is a display of names of general users who are located in the neighborhood and who have the target attribute.

To find out which members of Masonic Lodge 123 have their cell phones 10 turned on within the defined neighborhood, JOHN enters the target attribute "Masonic Lodge 123" using keypad 24. Processor 16 of JOHN's cell phone 10 can tell that "Masonic Lodge 123" is a public attribute rather than a private attribute because "Masonic Lodge 123" is not among the attributes appearing in attribute columns 36 of contact list 20. Alternatively, the menu scheme of cell phone 10 sets up the context for processor 16 knowing whether an entered attribute is a private attribute or a public attribute. The resulting display on display screen 26 is shown in FIG. 7. The display includes the names of TOM ("Thomas Brown") and SID ("Sidney Harris") as recorded in fields 40 of user profiles 22 of their cell phones 10. JOHN can call TOM or SID by selecting the appropriate name in the display.

In order for JOHN's cell phone 10 to determine which cell phones 10 have a target attribute in their user profiles 22, JOHN's cell phone 10 must have access to those user profiles 22. This access is via base stations 50. Whenever a cell phone 10 becomes active in the cell managed by a base station 50, either by moving into that cell or by being turned on within that cell, that base station 50 copies user profile 22 of that cell phone 10 into a local database, and also transmits that user profile 22 to the neighboring base stations 50 for copying to their own local databases. JOHN's cell phone 10 requests, from the base station 50 that is servicing JOHN's cell phone 10, the geographical locations of all cell phones 10 for which that base station 50 has recorded in its database corresponding user profiles 22 that include the target attribute. That base station 50 responds by sending to JOHN's cell phone 10 those geographical locations, along with the corresponding names as listed in fields 40 of user profiles 22 and the corresponding telephone numbers as listed in fields 42 of user profiles 22. Using the geographical location of JOHN's cell phone 10 as determined by navigation unit 28, processor 16 of JOHN's cell phone 10 computes the range to all the cell phones 10 whose geographical locations have been received from base station 50. Cell phones 10 whose ranges are less than or equal to the defined radius are within the defined neighborhood, and the corresponding user names are displayed on display screen 26.

The target attribute sought by a user of cell phone 10 need not be a user attribute of that user. Furthermore, a user of cell phone 10 can seek other users according to logical combinations of target attributes and ranges of numerical target attributes. For example, a user with the attributes "Single", "Jewish", "Male" and "Age=30" can seek users with the logical attribute combination "Single" AND "Jewish" AND "Female" AND "25≦Age≦32".

Note that JOHN need not have any user attributes of his own defined in his user profile 22 in order to seek cell phones 10 of other users that have a target attribute among their user attributes.

Geographical Locations of Contacts or General Users

Figure 8:
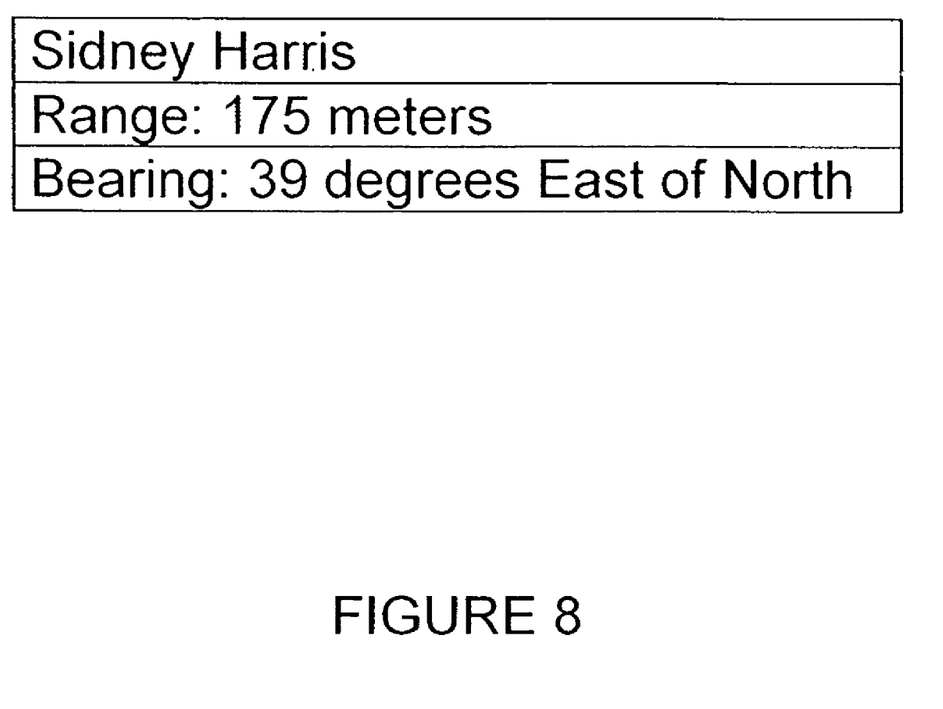
FIG. 8 is a display of the geographic location of one of the general users of FIG. 7.

JOHN can find out where TOM or SID are by calling and asking "where are you?" Alternatively, JOHN can invoke a display of the geographical location of TOM or SID on display screen 26, either as geographical coordinates in a standard coordinate system or relative to JOHN's own location. FIG. 8 shows an example of one such display, in terms of the range and bearing to SID relative to JOHN. Note that "range" and "bearing" are geographical coordinates in a coordinate system whose origin is at JOHN's location. The information needed by processor 16 of JOHN's cell phone 10 to compute this range and bearing is contained in SID's geographic location Is as received by JOHN's cell phone 10 in the course of identifying the other members of Masonic Lodge 123 whose cell phones 10 are active within the defined neighborhood.

All Active Contacts

Figure 9:
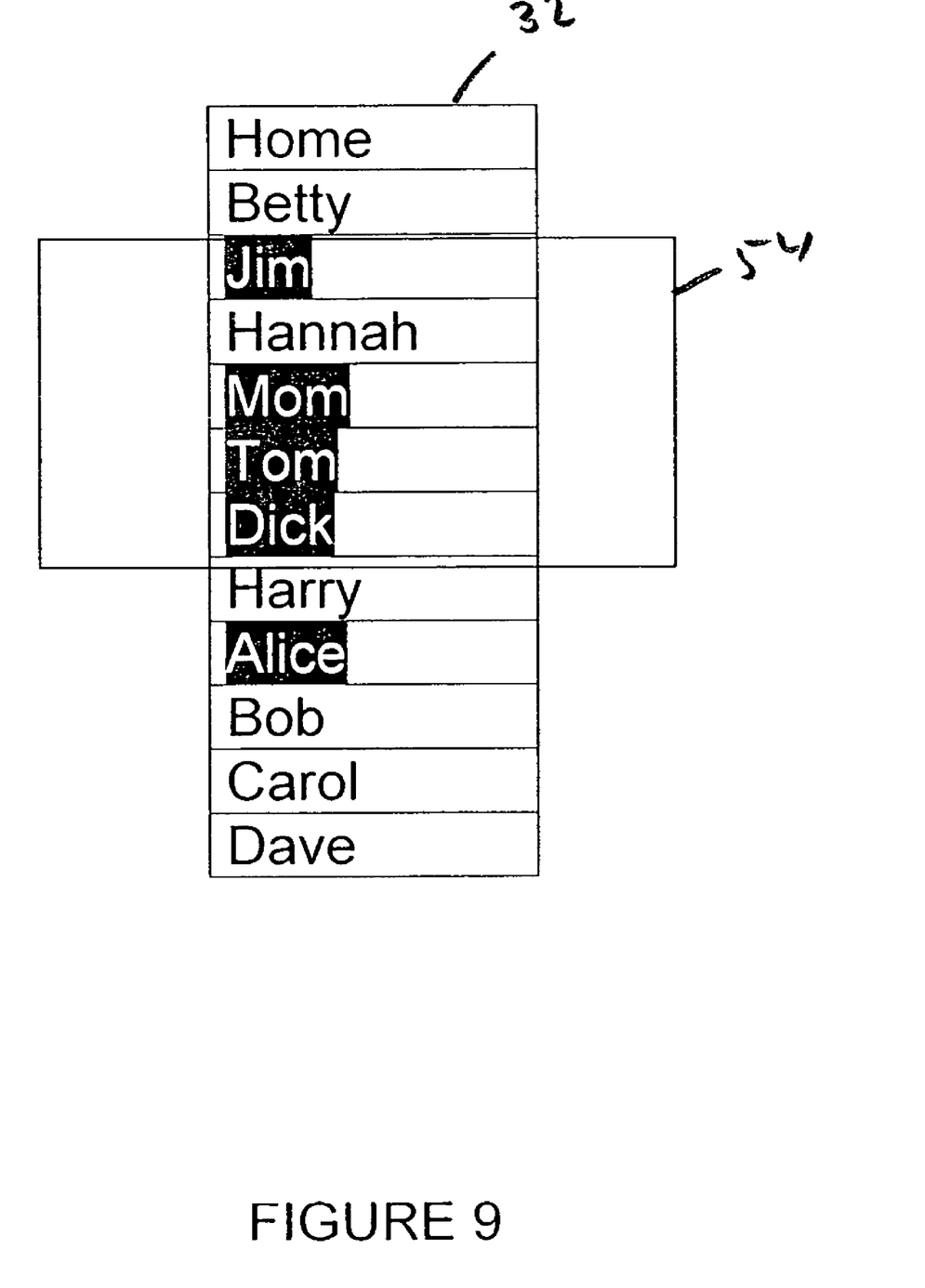
FIG. 9 is a contact list display in which all active contacts are highlighted.
Figure 10:
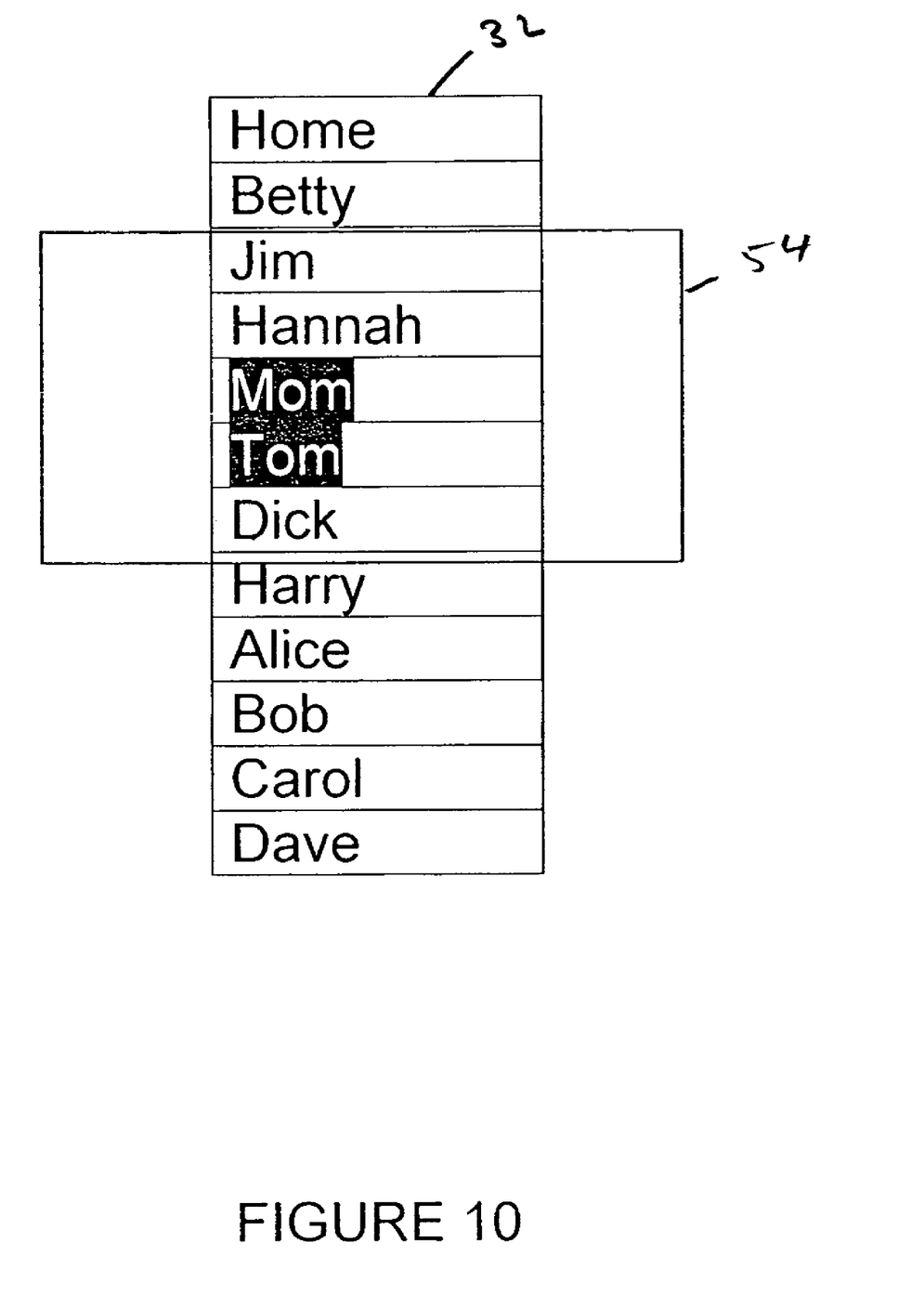
FIG. 10 is a contact list display in which all active contacts in the neighborhood are highlighted.

JOHN has the option of showing collectively and simultaneously, in the display of contact list 20, all contacts whose cell phones 10 are turned on, or all contacts within the defined neighborhood whose cell phones 10 are turned on. FIG. 9 is an example of a display of all contacts whose cell phones 10 are turned on, i.e., all the contacts illustrated in FIG. 4. Note that JOHN needs to scroll up and down in the display in order to see all the active contacts. FIG. 10 is an example of a display of all active contacts whose cell phones 10 are located within the defined neighborhood.

In the example of FIG. 4, transceivers 14 of cell phones 10 are configured to communicate with each other only indirectly, via base stations 50. In an alternative embodiment of the present invention, transceivers 14 of cell phones 10 also are configured to communicate directly with each other using a short range wireless protocol such as the BLUETOOTH™ protocol. Such a transceiver 14 periodically transmits a signal inviting any other such transceiver 14 that receives the broadcast to respond by transmitting an acknowledgement signal identifying itself. For example, according to the device discovery procedure of the BLUETOOTH™ standard, the first transceiver 14 periodically enters an "Inquiry" state in which the first transceiver 14 seeks other BLUETOOTH™ transceivers 14 that are within wireless communication range by broadcasting ID packets; and other BLUETOOTH™ transceivers 14 that are in range and that are in an "Inquiry Scan" state identify themselves to the first BLUETOOTH™ transceiver 14. When the first transceiver 14 receives an acknowledgement signal whose signal strength exceeds a predefined minimum signal strength, the first transceiver 14 sets up a piconet with the acknowledging transceiver 14 that supports direct wireless communication between the two transceivers 14, with the first transceiver 14 functioning as the piconet master and the other transceiver 14 functioning as the piconet slave. The first transceiver 14 continues to transmit the invitation signal periodically. Other transceivers 14 that acknowledge the invitation with acknowledgement signals whose strengths exceed the predefined minimum are added to the piconet as slaves. The predefined minimum signal strength thus defines a neighborhood of cell phone 10 of which the master transceiver 14 is a component. The user of the master cell phone 10 now is free to seek contacts, contacts with target attributes, general users with target attributes, and geographic locations thereof, as described above in the cellular telephony context of FIG. 4. In the absence of base stations, however, the master cell phone 10 must interrogate the slave cell phones 10 to find out what their respective geographic locations (as determined by the slaves' navigation units 28) and user profiles 22 (as stored in the slaves' memories 18) are.

While the invention has been described with respect to a limited number of embodiments, it will be appreciated that many variations, modifications and other applications of the invention may be made.

What is claimed is:

1. A wireless communication device comprising:
   (a) a transceiver for communicating with other wireless devices;
   (b) a contact list memory for storing a contact list that includes at least one contact name;
   (c) a mechanism for defining a neighborhood of the wireless communication device;
   (d) a contact name indication mechanism for indicating which of said at least one contact name is associated with a respective said other wireless device located within said neighborhood; and
   (e) a mechanism for setting up a piconet that includes the wireless communication device and said respective other wireless device that is located within said neighborhood.

2. A system for wireless communication, comprising:
(a) a plurality of wireless communication devices, each said wireless communication device including:
  (i) a transceiver for communicating with other wireless devices,
  (ii) a contact list memory for storing a contact list that includes at least one respective contact name;
  (iii) a mechanism for defining a neighborhood of said each wireless communication device, and
  (iv) a mechanism for indicating which of said at least one respective contact name is associated with a respective said other wireless device located within said neighborhood; and
(b) at least one base station for managing wireless communication among said wireless communication devices.

3. The system of claim 2, wherein at least one said base station includes a mechanism for determining respective geographical locations of said wireless communication devices.

4. The system of claim 2, wherein each said wireless communication device includes a respective navigation mechanism for determining a respective geographical location of said wireless communication device.

5. The system of claim 4, wherein each said navigation mechanism also is operative to inform said at least one base station of said respective geographical location of said respective wireless communication device.

6. A wireless communication device, comprising:
(a) a transceiver for communicating with other wireless devices;
(b) a contact list memory for storing a contact list that includes at least one contact name, wherein with at least one said at least one contact name is associated at least one respective attribute;
(c) a mechanism for defining a neighborhood of the wireless communication device;
(d) a contact name indication mechanism for indicating which of at least one contact name is associated with a respective said other wireless device located within said neighborhood; and
(e) a mechanism for defining a target attribute;
and wherein said mechanism for indicating which of said at least one contact name is associated with said respective other wireless device, that is located within said neighborhood, also indicates, for each said contact name with which is associated said at least one respective attribute, whether said target attribute is among said at least one respective attribute that is associated with said at least one contact name.

7. The wireless communication device of claim 6, wherein only said at least one contact name, that is associated with said respective other wireless device and that has said target attribute among said at least one respective attribute thereof, is indicated.

8. A system for wireless communication, comprising:
(a) a plurality of wireless communication devices, each said wireless communication device including:
  (i) a transceiver for communicating with other wireless devices,
  (ii) a contact list memory for storing a contact list that includes at least one respective contact name,
  (iii) a mechanism for defining a neighborhood of said each wireless communication device, and
  (iv) a mechanism for indicating which of said at least one respective contact name is associated with a respective said other wireless device located within said neighborhood; and
(b) at least one user profile memory for storing, for each said wireless communication device, a respective user profile;
wherein at least one said user profile includes at least one respective user attribute; and wherein, for each said wireless communication device: if said respective other wireless device is another of said plurality of wireless communication devices, and if said respective user profile of said respective other wireless device includes said at least one respective user attribute: then said mechanism, of said each wireless communication device, for indicating which of said at least one contact name is associated with said other wireless communication device, indicates whether said target attribute is among said at least one respective user attribute of said respective user profile of said respective other wireless communication device.

9. The system of claim 8, wherein only said at least one contact name, whose said other wireless communication device has said target attribute among said at least one respective user attribute of said respective user profile thereof, is indicated.

10. The system of claim 8, wherein each said wireless communication device includes a respective one of said at least one user profile memory, said respective user profile of said each wireless communication device being stored in said respective user profile memory of said each wireless communication device.

11. The system of claim 8, further comprising:
(c) at least one base station, for managing communication among said wireless communication devices, and including said at least one user profile memory.

12. A system for wireless communication, comprising:
(a) a plurality of wireless communication devices, each said wireless communication device including:
  (i) a transceiver for communicating with other wireless devices,
  (ii) a mechanism for defining a neighborhood of said each wireless communication device,
  (iii) a mechanism for defining a target attribute, and
  (iv) a display mechanism for indicating whether a respective said other wireless device, of a user who has said target attribute, is located within said neighborhood; and
(b) at least one base station for managing wireless communication among said wireless communication devices.

13. The system of claim 12, wherein said base station includes a mechanism for determining respective locations of said wireless communication devices.

14. The system of claim 12, wherein each said wireless communication device includes a navigation mechanism for determining a respective location of said each wireless communication device and informing said at least one base station of said respective location.

15. A system for wireless communication, comprising:
(a) a plurality of wireless communication devices, each said wireless communication device including:
  (i) a transceiver for communicating with other wireless devices,
  (ii) a mechanism for defining a neighborhood of said each wireless communication device,
  (iii) a mechanism for defining a target attribute, and
  (iv) a display mechanism for indicating whether a respective said other wireless device, of a user who has said target attribute, is located within said neighborhood; and (b) at least one user profile memory for storing, for each said wireless communication device, a respective user profile;

wherein at least one said user profile includes at least one respective user attribute; and wherein, for each said wireless communication device: if said respective other wireless device is another of said plurality of wireless communication devices, and if said respective user profile of said respective other wireless device includes said at least one respective user attribute: then said display mechanism of said each wireless communication device indicates that said respective other wireless device is located within said neighborhood if said target attribute is among said at least one respective user attribute of said respective user profile of said respective other wireless communication device.

16. The system of claim 15, wherein each said wireless communication device includes a respective one of said at least one user profile memory, said respective user profile of said each wireless communication device being stored in said respective user profile memory of said each wireless communication device.

17. The system of claim 15, further comprising:
(c) at least one base station, for managing communication among said wireless communication devices, and including said at least one user profile memory.

* * * * *